United States Patent
Herbing

(10) Patent No.: US 10,493,681 B2
(45) Date of Patent: Dec. 3, 2019

(54) EXTRUSION DEVICE

(71) Applicant: TROESTER GmbH & Co. KG, Hanover (DE)

(72) Inventor: Karsten Herbing, Sehnde (DE)

(73) Assignee: TROESTER GMBH & CO. KG, Hannover (DE)

( * ) Notice: Subject to any disclaimer, the term of this patent is extended or adjusted under 35 U.S.C. 154(b) by 120 days.

(21) Appl. No.: 15/805,151

(22) Filed: Nov. 7, 2017

(65) Prior Publication Data

US 2018/0126622 A1    May 10, 2018

(30) Foreign Application Priority Data

Nov. 7, 2016  (DE) .................. 10 2016 121 262

(51) Int. Cl.

| | |
|---|---|
| *B29C 48/35* | (2019.01) |
| *B29C 48/30* | (2019.01) |
| *B29C 48/92* | (2019.01) |
| B29L 30/00 | (2006.01) |
| B29C 48/07 | (2019.01) |

(52) U.S. Cl.
CPC .......... *B29C 48/30* (2019.02); *B29C 48/3001* (2019.02); *B29C 48/35* (2019.02); *B29C 48/92* (2019.02); *B29C 48/07* (2019.02); *B29C 48/301* (2019.02); *B29C 48/302* (2019.02); *B29C 2948/92628* (2019.02); *B29C 2948/92647* (2019.02); *B29L 2030/002* (2013.01)

(58) Field of Classification Search
CPC ....... B29C 48/07; B29C 48/30; B29C 48/302; B29C 48/35; B29C 48/92; B29C 2948/92647
See application file for complete search history.

(56) References Cited

U.S. PATENT DOCUMENTS

| | | |
|---|---|---|
| 3,142,091 A | 7/1964 | Curtiss |
| 3,871,810 A | 3/1975 | Geyer |
| 3,956,056 A | 5/1976 | Boguslawski et al. |

(Continued)

FOREIGN PATENT DOCUMENTS

| | | |
|---|---|---|
| DE | 2357665 C2 | 1/1985 |
| DE | 3424257 A1 | 1/1986 |

(Continued)

*Primary Examiner* — James P Mackey
(74) *Attorney, Agent, or Firm* — Leydig, Voit & Mayer, Ltd.

(57) ABSTRACT

In an embodiment, the present invention provides an extrusion device for producing a profile from plasticizable material, including at least one extruder head, in which the plasticized material can be supplied to a gap which is delimited by at least one roller and at least one bar that bears against a bearing surface in a predefined position via a fixing element in an operating position of the extrusion device. The fixing element includes a flat pressure-transmitting element which, in the operating position, can be placed against a pressure surface of the bar that is opposite the bearing surface, the pressure-transmitting element including a double-armed lever, which is pivotable about at least one axis, in order to compensate for a possible deviation from the predefined parallel orientation of the pressure-transmitting element with respect to the pressure surface of the bar.

14 Claims, 3 Drawing Sheets

(56) References Cited

U.S. PATENT DOCUMENTS

| | | | |
|---|---|---|---|
| 4,642,039 A | | 2/1987 | Anders |
| 4,911,631 A | * | 3/1990 | Harada ................... B29C 48/30 425/183 |
| 5,122,049 A | | 6/1992 | Baumgarten |
| 5,928,679 A | * | 7/1999 | Ohki ....................... B29C 48/30 425/327 |
| 8,282,378 B2 | * | 10/2012 | Ougier ................... B29C 48/30 425/224 |
| 2016/0107363 A1 | | 4/2016 | Le Gal |

FOREIGN PATENT DOCUMENTS

| | | | |
|---|---|---|---|
| DE | 3448026 | A1 | 3/1986 |
| DE | 69110246 | T2 | 10/1995 |
| EP | 0344890 | A1 | 12/1989 |
| JP | 2011073428 | A | 4/2011 |

\* cited by examiner

EXTRUSION DEVICE

CROSS-REFERENCE TO PRIOR APPLICATION

Priority is claimed to German Patent Application No. DE 10 2016 121 262.8, filed on Nov. 7, 2016, the entire disclosure of which is hereby incorporated by reference herein.

FIELD

The invention relates to an extrusion device for producing a profile from plasticizable material, comprising at least one extruder head, in which the plasticized material can be supplied to a gap which is delimited by at least one roller and at least one bar that, in an operating position of the extrusion device, bears against a bearing surface in a predefined position by means of a fixing element and is also referred to as an extrusion bar, profile bar or shaping bar.

BACKGROUND

DE 34 48 026 C2 and DE 34 24 257 A1 already describe apparatuses for controlling the outlet width for the production of treads for car tires or other profiles or webs made of rubber, elastomers or thermoplastic material, consisting of a nozzle, arranged at the material outlet of a screw extruder provided with a drive, for profiling the material. The nozzle outlet is formed by a housing part formed having a replaceable profile bar and by a rotating roller equipped with a drive and arranged perpendicular to the nozzle outlet. By means of hydraulic cylinders and the associated supports, the exchangeable profile bar is held securely in its positions.

In practice, extruder heads of this kind, also referred to as single-roller heads, are often already used for the production of vehicle tires, for example. A plasticized rubber mixture is fed into the extruder head and preshaped across the whole production width. In the extruder head there are replaceable bars which, at the outlet to the roller gap, ensure the exact adjustment of the extruder head opening to the given web thickness.

The use of such apparatuses is mainly suitable for profiles which have a rectangular cross-sectional surface, for example smooth sheets and webs, and for profiles without undercuts, for example profiled products. It is possible in this way to achieve a high degree of uniformity of the material thickness over the whole width of the web and a high degree of homogeneity of the rolled profile.

DE 691 10 246 T2 is equipped with both a roller pair and an extrusion bar. The rubber output from the nozzle opening is rolled and shaped between an upper roller and a lower roller.

Considerable advantages of single-roller head devices are mainly the low tool costs for the extrusion bar, the short retooling times on account of simple tool changeover, their suitability for complicated profile shapes, in particular valley profiles, and the lower investment needed for devices of this kind.

In practice, a disadvantage has been found to be the customary fixing of the bar by means of clamping, where the direction of action of the fixing force pushes obliquely on the bar. In this way, during the fixing process it is possible to unintentionally move the bar relative to the bearing surface and as a result the gap may, in deviating from its intended position, have an undefined size or may be pretensioned against the roller in an undefined manner.

SUMMARY

In an embodiment, the present invention provides an extrusion device for producing a profile from plasticizable material, comprising: at least one extruder head, in which the plasticized material can be supplied to a gap which is delimited by at least one roller and at least one bar that bears against a bearing surface in a predefined position via a fixing element in an operating position of the extrusion device, wherein the fixing element comprises a flat pressure-transmitting element which, in the operating position, is configured to be placed against a pressure surface of the bar that is opposite the bearing surface, the pressure-transmitting element comprising a double-armed lever, which is pivotable about at least one axis, in order to compensate for a possible deviation from the predefined parallel orientation of the pressure-transmitting element with respect to the pressure surface of the bar.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
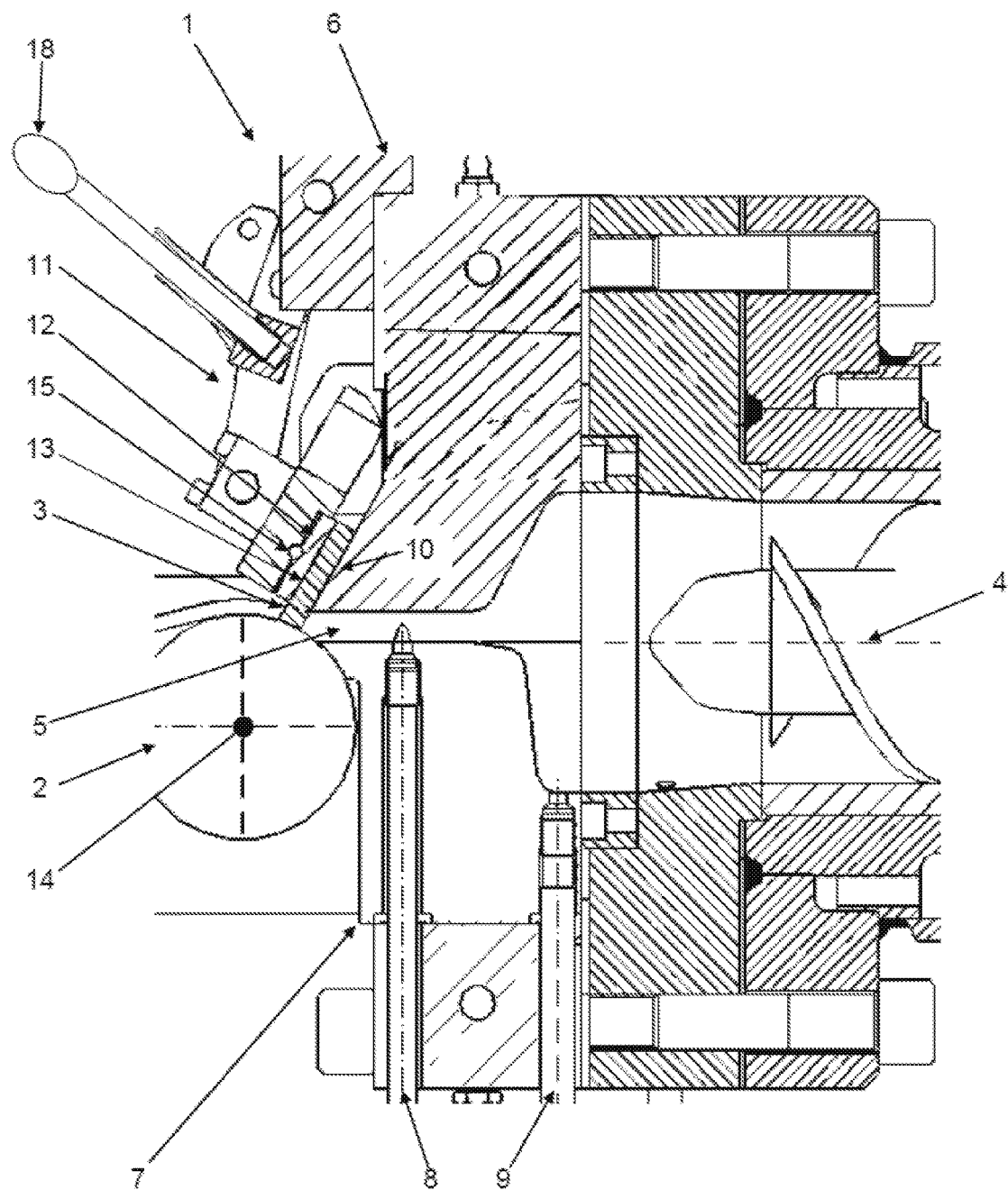
FIG. 1 shows an extruder head of an extrusion device in an operating position.

Thus according to the invention an extrusion device is provided in which the fixing element comprises a pressure-transmitting element which acts, for example, over the whole surface or in a point-like manner and which, in the operating position, can be placed against a pressure surface of the bar opposite the bearing surface as an abutment, the pressure-transmitting element being designed as a double-armed lever pivotable about at least one axis or as a rocker in order to compensate for deviations from the desired or predefined parallel orientation of the pressure-transmitting element with respect to the pressure surface of the bar. In this way it is possible for the first time to transmit a fixing force in a direction of action parallel to the surface normal of the pressure surface. This is made possible by the pressure-transmitting element not comprising, as in the prior art, a structurally predefined orientation which cannot be varied during operation, but rather, according to the invention, being pivotable about an axis according to the principle of a double-armed lever. Thus the pressure-transmitting element is always oriented, in a self-aligning manner, in parallel with the pressure surface of the bar. Of course, the pivotability of the pressure-transmitting element can be restricted in particular by stops, the axis preferably being only a short distance from the contact plane between the pressure-transmitting element and the pressure surface of the bar, for example between 0.5 cm and 5 cm. In this way, it is ensured that the transmission of force onto the bar is only performed once the parallel self-alignment of the pressure-transmitting element has actually occurred. Of course, the pivot movement is not restricted to a single degree of freedom. Rather, the pressure-transmitting element may also be gimballed. For example, a spherical element, in particular a ball, is also suitable as a bearing element for this purpose.

The pressure-transmitting element could be arranged on a translationally movable holding means in order to adjust the gap accordingly. However, it has proved to be particularly effective in practice for the pressure-transmitting element to be arranged on a pivotable support on an end portion facing away from a pivot axis of the support in order to thus achieve simple opening of the extruder head. In this way, the support can be pivoted, together with the pressure-transmitting element, almost completely out of the opening region and the bar can also be easily replaced.

A particularly preferred embodiment of the invention is also achieved by the axis of the rocker being oriented in parallel with a roller axis of the roller and/or the pivot axis of the support, in order to thus follow the pivot movement of the support associated with the closure of the extruder head by means of a continuous adjustment of the inclination of the pressure-transmitting element. Thus it is possible to maintain a permanently parallel alignment of the pressure-transmitting element with respect to the bar even during the closing movement.

The support may be fed by means of a drive. However, an embodiment of the invention is particularly practical in which the support is designed to be pivotable from a position of rest into the operating position by means of an in particular manually operated operating lever, which is designed in particular as a toggle lever closure. In this way, it is ensured that locking of the bar is easy and is self-clamping in the operating position, it being possible to provide, at least in the operating position, an additional latching function for safety, and sensory monitoring by means of a control unit.

The direction of action of the fixing force of the fixing element could be perpendicular to a gap plane. Particularly preferably however, the direction of action of the force against the pressure surface of the bar, which can be transmitted by means of the pressure body in the operating position, is tangential to the roller such that the force vector of the fixing force is free of direction components in the feeding direction to the roller.

Furthermore, the object is also achieved according to the invention by an extrusion device as described herein by the bar being, in the operating position, pretensioned towards the roller by means a pretensioning element, which for example can be moved pivotally about a tensioning axis or translationally, in the radial direction with respect to said roller. The pretensioning element acts on a narrow side or end face of the bar facing away from the roller, such that the bar is fed towards the roller on account of a change in the angular position of the pretensioning element. Preferably, the feeding movement on account of the pivot movement of the pretensioning element is performed at the same time as the extruder head is closed, during the opening movement of the extruder head and the pretensioning element counter to a pretensioning force acting on the pretensioning element. This self-acting mechanism makes possible a constant but adjustable pressing force of the bar on the roller.

Particularly preferably, the tensioning axis is oriented in parallel with the roller axis, and therefore the risk of the bar getting stuck during the feeding movement towards the roller can be virtually excluded.

Furthermore, it has proved to be particularly expedient for the pretensioning element to be, in the operating position, movable in a direction facing away from the roller counter to the feeding direction counter to an adjustable pretensioning force, in particular of a spring element, in order to set a larger size of the gap between the bar and the roller. In this way, the gap is automatically adjusted in a force-dependent manner by the pretensioning element, which, on account of the spring pretensioning, always bears against the roller by the predefined force or limits the gap, it being possible for a deflection movement to occur automatically counter to the pretensioning force on account of changed pressure conditions.

Furthermore, the pretensioning element may also preferably be moved into a position of rest which, in which the bar is not loaded or only slightly loaded, by means of the support counter to the action of the pretensioning force of the spring element, in which position of rest the pretensioning element and the bar have a larger distance apart in order to thus improve accessibility to the flow channel.

The lower part of the flow channel may also be a fixed component of the extruder head for example. The exchangeable upper head part determines the outlet width such that only a single component needs to be changed to change the outlet width. In this way, the process is simplified and the time required for this is reduced.

According to a further particularly preferred modification of the invention, the pretensioning element has a first contact surface for the support provided with the pressure-transmitting element and a second contact surface for the bar, the surfaces or the surface normals of said surfaces having an inclined, in particular perpendicular orientation to one another. In this way, a kinematic coupling of the pressure-transmitting element pretensioning the bar against the bearing surface tangentially to the roller and the pretensioning element pretensioning the bar radially against the roller is achieved by the two pretensioning forces being reduced or interrupted at the same time, in particular when opening the extruder head. In particular, no further radial pretensioning force acts on the bar when the holding forces fixing the bar on the bearing surface are withdrawn. In this way, operation is simplified further.

The pretensioning element could be designed to be translationally movable by means of a sliding guide. However, a modification of the invention is particularly promising in which the pretensioning element comprises a pivot lever so as to therefore not only make it possible to increase the introduced force by means of accordingly dimensioned lever arms, but to also at the same be able to provide, on the same pivot lever, two contact surfaces of which the position and orientation can be changed. Furthermore, the pivot lever may also be designed to transmit force according to the principle of an eccentric cam.

The extrusion device according to the invention provided with an extruder head 1 will be explained in more detail in the following with reference to the various sectional views in FIGS. 1 to 3. The extrusion device is used for producing a profile from plasticizable material. The shaping of the profile is performed in a gap between a roller 2 and a bar 3 designed as a profile bar in a region of a flow channel 5 facing away from an extruder screw 4, which flow channel is delimited by an exchangeable upper head part 6 and a lower head part 7 connected to the extruder head 1. The lower head part 7 is used at the same time for mounting a temperature sensor 8 and a pressure sensor 9, while the upper head part 6 forms a bearing surface 10 for the bar 3.

In the operating position of the extrusion device shown in FIG. 1, the bar 3 is pretensioned against the bearing surface 10 by a force Ft in a predefined position by means of a fixing element 11. For this purpose, the fixing element 11 has a flat pressure-transmitting element 12, which bears against a pressure surface 13 of the bar 3. In order to automatically adjust the desired parallel orientation of the pressure-transmitting element 12 with respect to the pressure surface 13, the pressure-transmitting element 12 is pivotable about an axis 15 which is in parallel with a roller axis 14 of the roller 2, which extends through the center of the surface of the pressure-transmitting element 12 and which divides the pressure surface 13 into two partial surfaces of substantially the same size.

Figure 2:
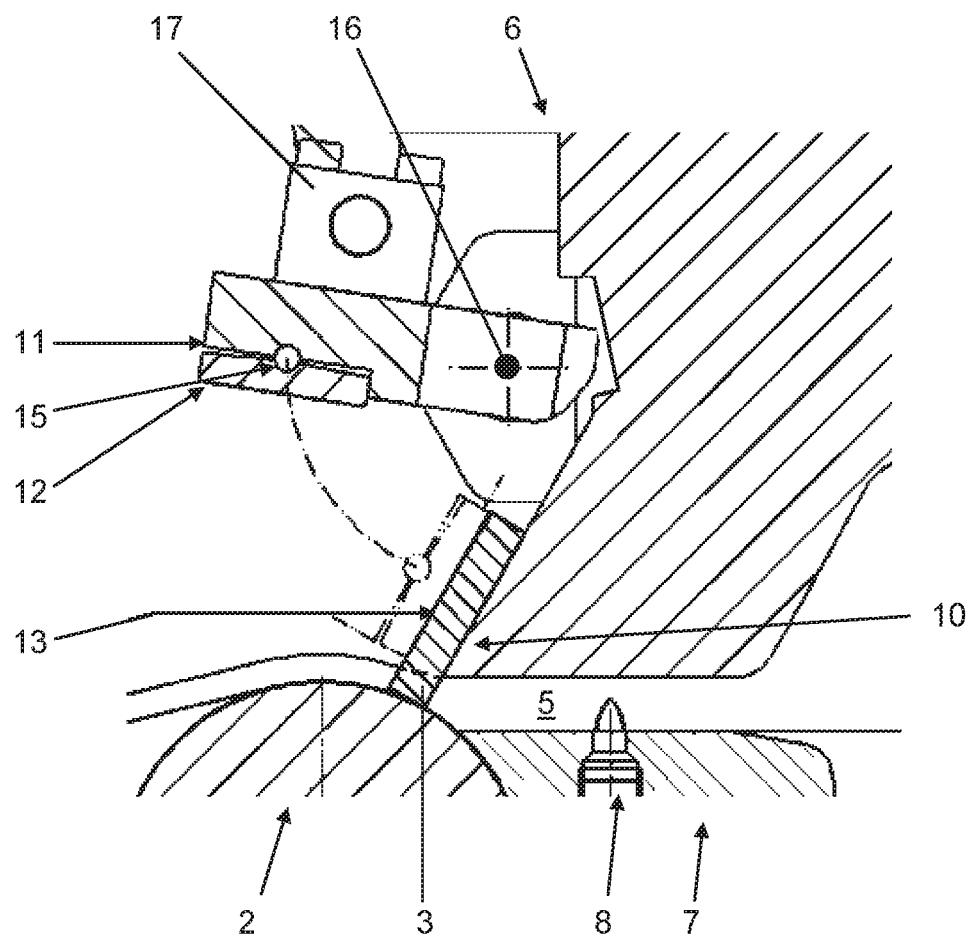
FIG. 2 shows the extruder head shown in FIG. 1 in a position of rest.

The pressure-transmitting element 12 is held in turn on a pivotable support 17, which has a pivot axis 16 parallel to the axis 15, on an end portion facing away from said axis and can be pivoted, together with the support 17, into a position of rest shown in FIG. 2. A manually operated operating lever 18, which is shown in FIG. 1 and is designed to be self-clamping according to the toggle lever principle, is used for adjustment.

Figure 3:
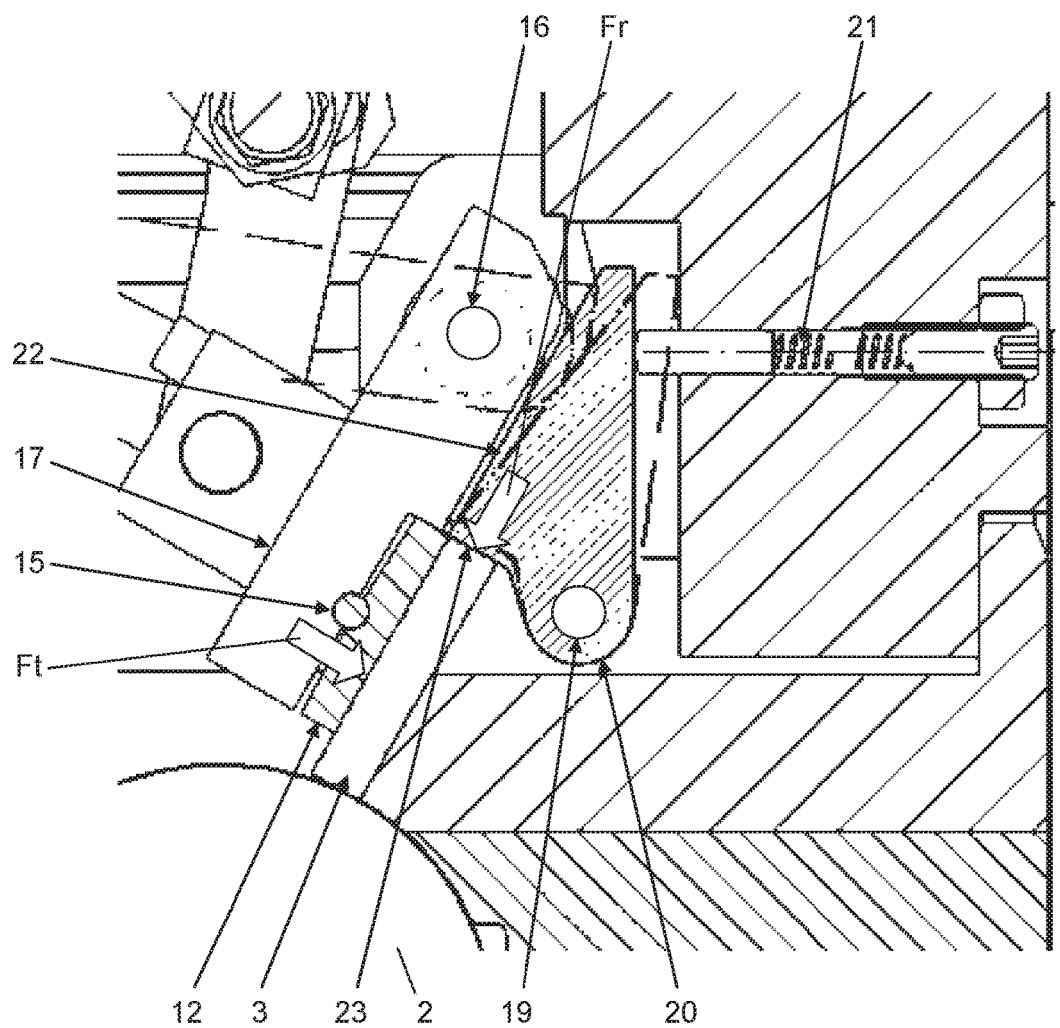
FIG. 3 is a detailed view of the extruder head shown in FIG. 1 in an operating position.

In addition to fixing the bar 3 by means of the pressure-transmitting element 12 against the bearing surface 10 as an abutment, the extrusion device is also equipped with a pretensioning element 20 which is pivotable about a tensioning axis 19 and by means of which the bar 3 is additionally pretensioned towards the roller 2 by a force Fr in the radial direction, as shown in FIG. 3. For this purpose, the tensioning axis 19 is oriented in parallel with the roller axis 14 and to the pivot axis 16 of the support 17. In the operating position, the pretensioning element 20 is loaded by an adjustable pretensioning force of a spring element 21 acting on the bar 3, which force is thus constant during operation. Here the pretensioning element 20 has a first contact surface 22 for the support 17 of the pressure-transmitting element 12 and a second contact surface 23 for the bar 3 orthogonal thereto. In this way, a pivot movement of the pretensioning element 20 into the position of rest, shown only by dashed lines in FIG. 3, results in a movement of the pretensioning element 20 counter to the pretensioning force of the spring element 21, as a result of which the bar 3 is unloaded at the same time.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 extruder head
2 roller
3 bar
4 extruder screw
5 flow channel
6 head part
7 head part
8 temperature sensor
9 pressure sensor
10 bearing surface
11 fixing element
12 pressure-transmitting element
13 pressure surface
14 roller axis
15 axis
16 pivot axis
17 support
18 operating lever
19 tensioning axis
20 pretensioning element
21 spring element
22 contact surface
23 contact surface
Fr force
Ft force

The invention claimed is:

1. An extrusion device for producing a profile from a plasticizable material, comprising:
at least one extruder head, in which the plasticized material can be supplied to a gap which is delimited by at least one roller and at least one bar that bears against a bearing surface of the at least one extruder head in a predefined position via a fixing element in an operating position of the extrusion device,
wherein the fixing element comprises a flat pressure-transmitting element which, in the operating position, is configured to be placed against a pressure surface of the bar, which pressure surface is opposite a surface of the bar that bears against the bearing surface, the pressure-transmitting element comprising a double-armed lever, which is pivotable about at least one axis, in order to compensate for a possible deviation from a predefined parallel orientation of the pressure-transmitting element with respect to the pressure surface of the bar.

2. The extrusion device according to claim 1, wherein the pressure-transmitting element is arranged on a pivotable support on an end portion facing away from a pivot axis of the support.

3. The extrusion device according to claim 2, wherein the at least one axis of the double-armed lever is oriented in parallel with a roller axis of the roller and/or the pivot axis of the support.

4. The extrusion device according to claim 2, wherein the support is pivotable from a position of rest into the operating position via an operating lever which is configured to be operated manually and comprises a toggle lever closure.

5. The extrusion device according to claim 1, wherein a direction of action of a force which can be transmitted by the pressure-transmitting element in the operating position extends tangentially to the roller against the pressure surface of the bar.

6. An extrusion device for producing a profile from a plasticizable material, comprising:
   at least one extruder head, in which the plasticized material can be supplied to a gap which is delimited by at least one roller and at least one bar bearing against a bearing surface of the at least one extruder head in a predefined position via a fixing element in an operating position of the extrusion device,
   wherein, in the operating position, the bar is pretensioned towards the roller by a pretensioning element by a force in a radial direction with respect to the at least one roller.

7. The extrusion device according to claim 6, wherein the pretensioning element is pivotable about a tensioning axis.

8. The extrusion device according to claim 7, wherein the tensioning axis is oriented in parallel with a roller axis of the at least one roller.

9. The extrusion device according to claim 6, wherein, in the operating position, the pretensioning element is configured to be moved in a direction facing away from the at least one roller counter to an adjustable pretensioning force in order to reduce the pretensioning of the bar against the at least one roller.

10. The extrusion device according to claim 6, wherein the pretensioning element is configured to be moved into a position of rest, in which the bar is not loaded as much as it is in the operating position of the extrusion device, via a pivotable support, counter to an action of the pretensioning force.

11. The extrusion device according to claim 6, further comprising a pressure-transmitting element is arranged on a pivotable support, and
   wherein the pretensioning element comprises a first contact surface for the support provided with the pressure-transmitting element and a second contact surface for the bar, planes of the two contact surfaces being inclined with respect to one another.

12. The extrusion device according to claim 7, wherein the pretensioning element comprises a pivot lever.

13. The extrusion device according to claim 9, wherein the adjustable pretensioning force is provided by a spring element,
   wherein the pretensioning element is pivotable about a tensioning axis,
   wherein the spring element is in contact with the pretensioning element, and
   wherein the pretensioning element is configured to pivot about the tensioning axis upon adjustment of the adjustable pretensioning force.

14. The extrusion device according to claim 11, wherein the planes of the two contact surfaces are oriented perpendicular to one another.

* * * * *